March 27, 1934.  F. E. HALLORAN  1,952,248
PROJECTION SYSTEM
Filed June 25, 1929  3 Sheets-Sheet 1
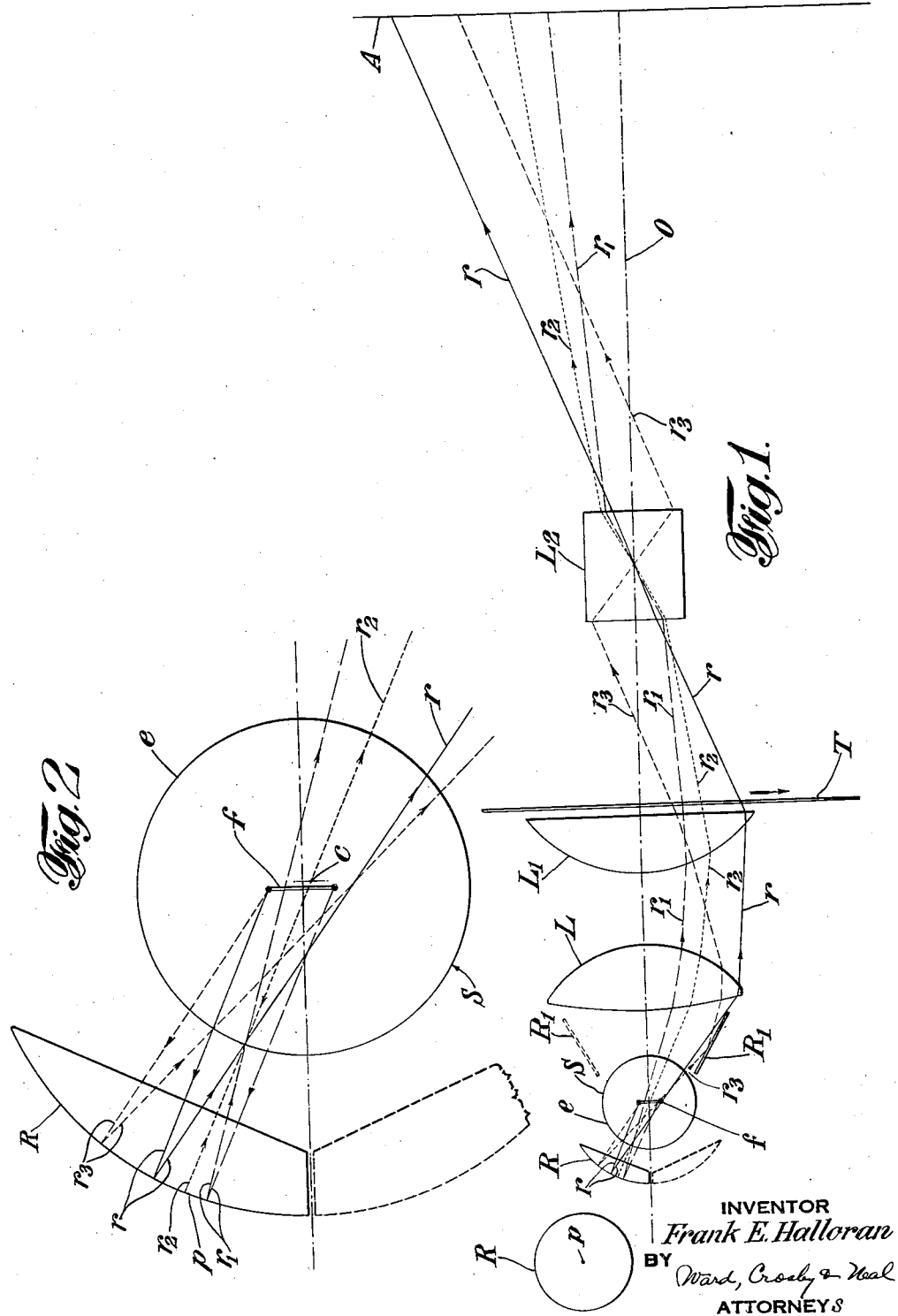
INVENTOR
Frank E. Halloran
BY Ward, Crosby & Neal
ATTORNEYS March 27, 1934.  F. E. HALLORAN  1,952,248
PROJECTION SYSTEM
Filed June 25, 1929   3 Sheets-Sheet 2
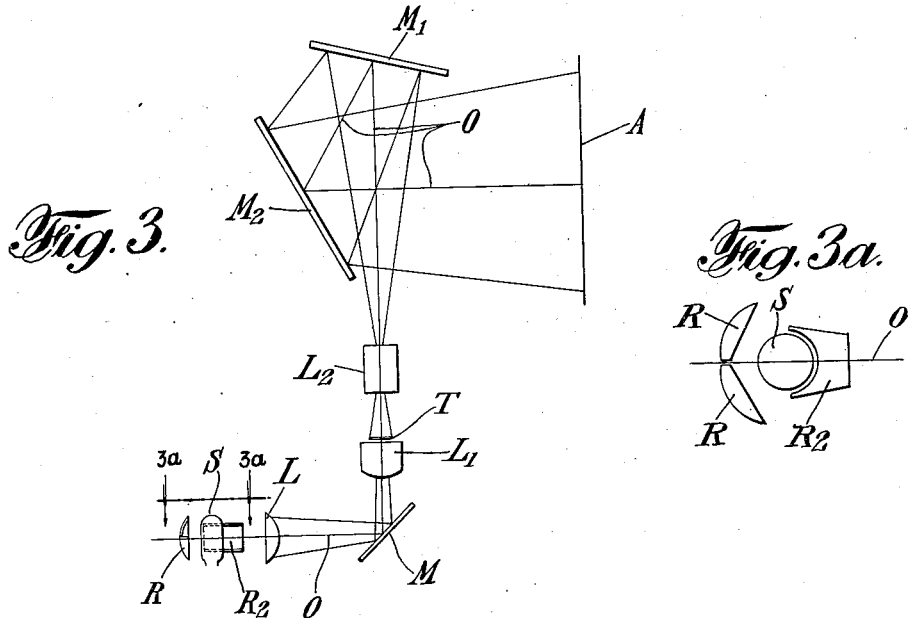
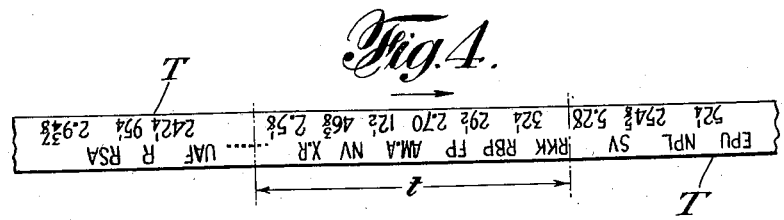
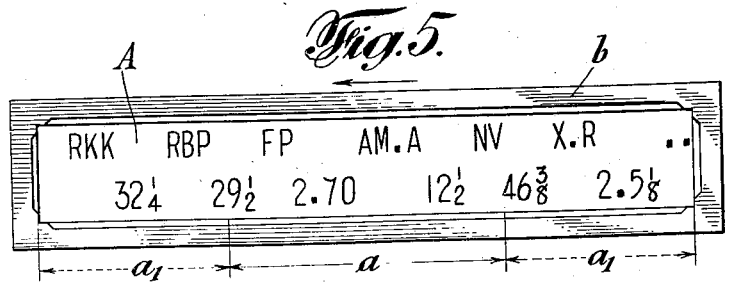
INVENTOR
*Frank E. Halloran*
BY *Ward, Crosby & Neal*
ATTORNEYS

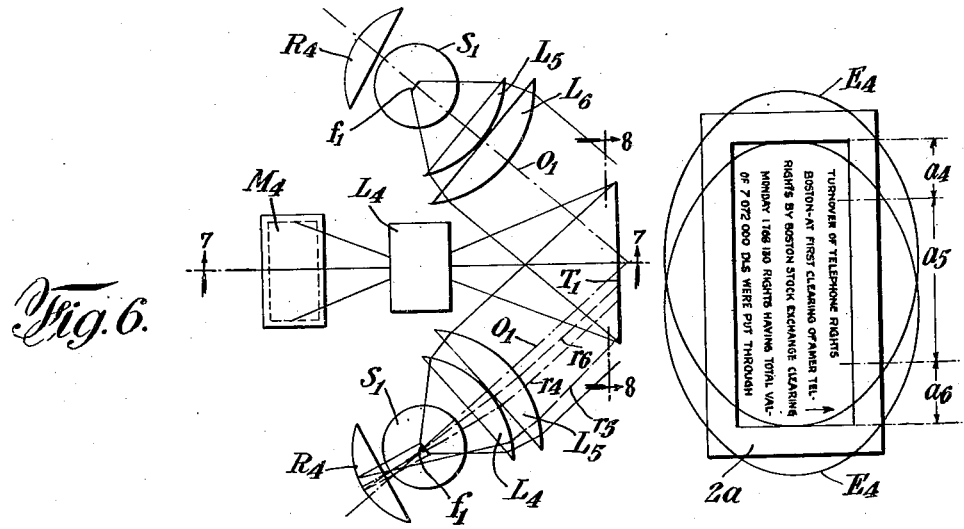
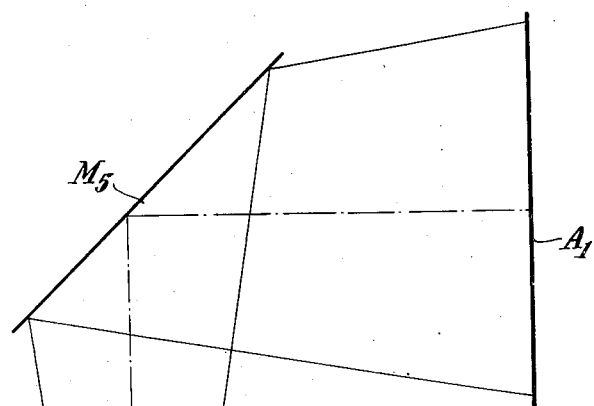
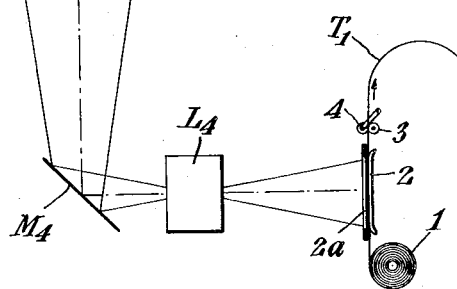

Patented Mar. 27, 1934

1,952,248

UNITED STATES PATENT OFFICE 1,952,248

PROJECTION SYSTEM

Frank E. Halloran, Brooklyn, N. Y., assignor to Trans-Lux Daylight Picture Screen Corporation, New York, N. Y., a corporation of Delaware Application June 25, 1929, Serial No. 373,612

3 Claims. (Cl. 88—24)

My invention relates to a projection system.

My invention involves an arrangement for effecting a desired distribution of light transversely of a path traversed thereby.

More particularly, my invention involves an arrangement for controlling illumination of a screen of any suitable or desired character.

Still more particularly, my invention relates to a projection system for enhancing or increasing the illumination of an outer screen area.

My invention also involves an arrangment for obtaining high or great light intensity on a light reflecting surface.

Further objects, advantages and characteristics of my invention will become apparent from the following detailed description taken in connection with the accompanying drawings.

My invention resides in the system, features and combinations of parts of the character hereinafter described and claimed.

For an illustration of one of the many forms my invention may take, reference is to be had to the accompanying drawings, in which:

Figure 1 is a diagrammatic view illustrating my invention in connection with light reflecting members R shown in plan, one of said reflectors also being shown in elevation;

Fig. 2 is an enlarged view of a part of the system shown in Fig. 1;

Fig. 3 is a diagrammatic view illustrative of my invention and an important application thereof;

Fig. 3a is a plan view looking in the direction of the arrows from the line 3a—3a of Fig. 3;

Fig. 4 is a plan view of a web- or tape-section having indicia thereon;

Fig. 5 is a front elevational view of the screen shown in Fig. 3;

Fig. 6 is a diagrammatic view illustrative of another form of my invention and of another application thereof;

Fig. 7 is a sectional view, partly in elevation, and is taken on the line 7—7 of Fig. 6 looking in the direction of the arrows; and Fig. 8 is an enlarged view looking in the direction of the arrows from the line 8—8 of Fig. 6.

In the form of my invention shown in Fig. 1, S represents any suitable source of light. Preferably and as illustrated, the source of light S is an incandescent electric lamp having the usual glass envelope $e$ within which is disposed and supported suitable filament structure $f$ which may be of suitable height and have a width of the order shown.

Spaced from the source of light S is any suitable screen or viewing surface A which, however, in the form herein illustrated is adapted for "through" projection, namely projection of that character wherein the beam of light traverses the screen, the observer or audience being on that side thereof opposite said source of light S.

In the example shown, there is disposed between the source of light S and the screen A a member or surface T of transparent or translucent material, ordinarily the former. Member T comprises or has formed thereon indicia, representations, characters, figures, numbers, or the like hereinafter generically termed "indicia". In the example shown although by no means necessarily, member T is a section of transparent stock ticker tape movable, for example, in the direction of the arrow, Fig. 1, and having printed thereon, in suitable colored ink, groups of numbers and letters indicative of stock quotations. As well, if desired, member T may be opaque or light reflecting in which case, of course, the light generating and lens system would be suitably rearranged. This is more fully hereinafter described.

Any suitable lens system is disposed between the source of light S and the member T. In the example illustrated, there is thus utilized a condenser lens L receiving light directly from the source of light S and passing a beam of light to a condenser lens L1; from the latter, the light beam passes to and through the indicia-carrying member T, then through a projection or objective lens L2 and then into engagement with the screen A to render visible thereon images of the indicia.

The screen A may be of any suitable size and shape. As herein shown, it is disposed in the normay light field of the source of light S and the center thereof coincides with the optical axis O of the system which also passes centrally through the lenses L, L1 and L2. To avoid complication, there is no illustration showing light passing directly from the filament $f$ to the lens L. By this light, the screen A is illuminated non-uniformly, i. e. the area at the center thereof is illuminated to greater degree than are areas at the sides or ends of said screen, or immediately adjacent the periphery thereof. Primarily, this non-uniform illuminating effect exists because the light path to the central area of the screen is shorter than to the other areas aforesaid; further, the light passing to said central area undergoes less refraction, reflection and absorption losses.

In prior art projection systems, it has been found desirable to utilize a reflector for enhancing illumination of the screen. However, in so doing, non-uniform illumination still persists, since the light distribution is substantially the same no matter whether the light comes directly from the source of light or indirectly from said source by reflection from the prior art reflector. In other words, either with or without the prior art reflector, the screen central area is illuminated to greater degree than are areas at the sides, ends or adjacent the periphery of said screen.

In accordance with my invention, the screen ilumination is much more uniform than with arrangements of the prior art. To this end, a prominent form of my invention involves the utilization of a reflector system causing the delivery to the above described lower illuminated screen areas of a greater amount of light than occurs with a prior art reflector arrangement; while so doing, the amount of light delivered to the higher illuminated screen area, namely, the central area, remains substantially unchanged or is not greatly increased.

As herein illustrated and described, a reflector system in accordance with my invention comprises a reflector R usually spherical in the sense that it is coincidal with a part of the periphery of a sphere of suitable diameter. The concave side of reflector R faces the source of light S and it may be formed of any suitable material; for example, it may be an ordinary spherical mirror.

The direction in which extends the hereinafter defined principal axis of the reflector R determines the general direction in which the greater amount of light is reflected and, as hereinafter pointed out, a line defining said principal axis meets the lens L, or equivalent, in a side area thereof. In other words, reflector R is so positioned that it reflects light largely to a side area of lens L, or equivalent, and not largely to the central area thereof as with prior art reflector systems.

For purposes of explanation, there is shown in Figs. 1 and 2 parallel edge light rays $r$ and $r1$ bounding a plane section of a light beam. The rays $r$ and $r1$ are shown as emanating from the respective sides of the filament $f$, the arrows indicating their direction of travel to the reflector R, and then in reverse direction to and through the lenses L and L1, the member T, the lens L2 and finally to the screen A. As clearly illustrated, said rays $r$ and $r1$, together with the light beam defined thereby, traverse areas of the lenses L and L1, together with an area of member T, well away from the respective center areas thereof, said rays $r$ and $r1$, together with said light beam eventually coacting, not with the central area of screen A, but with an area at the side or adjacent the periphery thereof.

Of course, a multitude of light rays emanate from the filament $f$ and are reflected by the reflector R to and through the lenses L and L1, member T, lens L2 and into engagement with the screen A. Some of these rays pass substantially centrally of the lens L and eventually coact with the screen A throughout a central area thereof. However, by far the greater number of rays or the greater amount of light traverse a path such as defined, for example, by the light rays $r$ and $r1$.

Accordingly, it results that compensation is effected for non-uniform illumination of the screen A as effected by light passing thereto directly from the source of light S. As stated, such direct passage of light causes the central screen area to be illuminated to a greater degree than is an area removed from the center of said screen. In accordance with my invention, there is delivered to said last named screen area by the reflector R a greater amount of light than is thereby delivered to the central screen area. It follows, therefore, that the screen is more uniformly illuminated than with arrangements of the prior art.

The reflector R may be so positioned that its center of curvature is positioned as desired. As illustrated in Fig. 2, such center is illustrated as being at a point $c$ very closely adjacent the filament $f$. The point $p$ represents the pole of said reflector. A line passing through the filament $f$ and including the points $c$ and $p$ constitutes the principal axis of the reflector R and this axis is illustrated as coinciding with a light ray $r2$ which passes from the filament $f$ to the reflector R. Ray $r2$ is reflected back upon itself and meets the lens L in a side area thereof; it traverses said lens L, the lens L1, member T, lens L2, and meets the screen A within the space defined by the light rays $r$ and $r1$.

An auxiliary feature of my invention involves the provision of a member R1 positioned, for example, as illustrated in Fig. 1, between the source of light S and the lens L. Preferably, member R1 comprises a plane surface of suitable area or extent which is suitably light reflecting on the face thereof nearer the light path. Under some circumstances, if desired, member R1 may be closely associated or form a continuation, in effect, of the reflector R.

A ray of light $r3$ is shown as passing from the filament $f$ to the reflector R. After reflection, said ray $r3$ engages the member R1 and is thereby further reflected so that it passes to and through the lens L, lens L1, member T, and lens L2. Ray $r3$ engages the screen A, for example, as illustrated in Fig. 1 and serves to there intensify the screen illumination. Were it not for the provision of the member R1, ray $r3$ would continue along a straight path without reflection as indicated. It would not meet the lens L and, therefore, would not traverse the member T nor reach the screen A.

Of course, it is obvious that the light ray $r3$ is representative of but one of a multitude of light rays that are reflected by the member R1 to cause illumination of the screen A in a region removed from the center thereof.

Ordinarily, other reflectors R and R1 are utilizable as indicated by dotted lines in Fig. 1 to increase the degree of illumination at the other side of the optical axis O. The reflector R indicated by the dotted lines functions as does the hereinbefore described reflector R and, likewise, the reflector R1 indicated by the dotted lines functions as does the hereinbefore described reflector R1. To avoid confusion, lines indicative of the paths of light rays have not been shown as coacting with those reflectors R and R1 indicated by dotted lines.

Where a plurality of reflectors R, R are thus utilized, they may have adjacent edges thereof removed, if desirable and necessary, to permit proper positioning thereof, or they may be made of smaller diameter so as to clear each other.

An arrangement of the character herein described is designed particularly for use with a member T of tape- or web-like form in which case the screen A is of elongated, rectangular configuration. To more clearly illustrate this application of my invention, reference is to be had to Fig. 3 wherein a mirror M is shown as positioned between the lenses L and L1 to cause light emanating from said lens L to be deflected through the lens L1, through the translucent or transparent tape T, shown in vertical cross-section, and then through the lens L2. After leaving the lens L2, the light is reflected by a suitable mirror system comprising, in the example shown, angularly related mirrors M1 and M2, the light finally engaging or coacting with the screen A.

A plan view of one form of tape T utilizable in accordance with my invention is shown in Fig. 4, the tape comprising printed characters indicative of stock quotations and being movable, for example, from left to right, Fig. 4. The view of the tape in Fig. 4 is the appearance thereof when viewed from the same side of the projection system of Fig. 3 as is occupied by an observer when viewing the screen A.

As the tape T is positioned in Fig. 4, a section $t$ between the dash-and-dot lines is in the effective light field and, as shown in Fig. 5, images of the printed characters on said section $t$ appear on the screen A which, as illustrated, may be carried by a frame $b$, said images appearing at one end of said screen, moving thereacross, and vanishing from view at the other end thereof.

By utilizing a projecting system of the prior art, illumination is obtained of the entire screen surface shown in Fig. 5. Such illumination, however, is non-uniform in that the central area $a$ is illuminated to a higher degree than are the screen end areas $a1$, $a1$ for example. However, by utilizing the reflectors R, R or proceeding otherwise in accordance with my invention, the degree of illumination of said end areas $a1$, $a1$ is greatly increased without, at the same time, substantially or inordinately increasing the degree of illumination of said central area $a$.

The reflector R2 shown in Figs. 3 and 3a is similar in function to the reflector R1 of Fig. 1 but is structurally, as is the member 42 shown in my copending application Serial No. 373,767, filed June 26, 1929 whereby light at both sides of the light path is trapped.

Referring to Figs. 6 and 7, there is illustrated another form and application of my invention wherein T1 represents any suitable indicia-bearing member or surface. In the example shown, member T1 is a paper web of the character utilized with ordinary "news tickers" which print late information of news value on the web. Ordinarily and as illustrated, member T1 is formed of suitable light reflecting paper, the aforesaid information being printed thereon with suitable colored ink.

As shown in Fig. 7, the blank web is illustrated as a suitably supported roll 1 which is disposed adjacent a web support 2 and a frame 2a disposed to one side thereof, the aforesaid printing mechanism being positioned, for example, between the roll 1 and support 2. Suitably controlled driven and idler rolls 3 and 4 generally shown in Fig. 7 coact with the web T1 to move the same, step-by-step upon completion of the printing of each line, between the support 2 and the frame 2a, the latter being rectangular in the example shown, and defining a web illuminating region of similar configuration, images of the indicia in said region at any given time being displayed on the hereinafter described screen A1.

As illustrated in Fig. 6, S1 represents sources of light suitably spaced from the web T1 and of any suitable character such, for example, as hereinbefore described, each source of light S1 containing a filament $f1$. As stated above, the web T1 is of light reflecting character, the reflected light passing through an objective or projecting lens L4 and being deflected by a mirror M4 into engagement with another mirror M5, the light reflected from said last named mirror causing the display on the screen A1 of images of any indicia disposed within the illuminated web region. In the illustrated form of my invention, although not necessarily, the screen A1 is of the same character as the aforesaid screen A, namely, adapted for "through" projection.

In accordance with my invention, a lens L5 is disposed between each source of light S1 and the web T1 to thereby intensify the illumination of the latter. The lenses L5 may be of any suitable character, either spherical or aspherical, and herein are illustrated as plano-convex and hence spherical in character. Depending upon the design of said lenses L5 when of the character just stated, the light rays passing toward the web T1 may be parallel or they may form a conical beam wherein the light rays either converge or diverge.

If desired and in accordance with my invention, a second lens L6 may be disposed between each source of light S1 and the web T1. The lenses L6 may be of any suitable character and, as illustrated, are similar to the lenses L5 in the sense that they are plano-convex or spherical. When the lenses L5 and L6 are thus associated, those in each lens system may be said to coact or interact with one another. Thus, for example, the beam of light emanating from a lens L5 may be conical in a diverging sense. However, after passage through the adjacent lens L6, the light rays may be parallel and form a cylindrical light beam. Or, any other suitable effect may be obtained. Thus, the lens L6 may enhance conical divergence of the beam existing after passage thereof through the adjacent lens L5, etc., etc.

The utilization of a lens system comprising one or more of the lenses L5, L6, or equivalent, between each source of light and the web T1 greatly increases the efficiency of the illuminating system. However, the same objection obtains with this illuminating system as is the case with the system illustrated in Figs. 1 through 5. In other words, the light distribution over the space defined by the frame 2a is such that, on the screen A1, an effect is obtained which corresponds with that described in connection with Fig. 5. That is, the screen A1 throughout the central area thereof is illuminated to a greater degree than at the ends thereof.

To overcome this disadvantage, light reflectors operating in accordance with the principle hereinbefore described may be incorporated with the illuminating system of Figs. 6, 7 and 8. To this end and as illustrated at the bottom of Fig. 6, a reflector R4 which, for example, may be of the same character as the hereinbefore described reflectors R, may be so positioned as to direct light principally toward a non-central area of the web T1; in other words, said reflector R4 illuminates a web side area $a6$ to greater intensity than it illuminates the web central area $a5$, Fig. 8. Reflector R4 is thus properly positioned in accordance with my invention when a line defining the principal axis thereof is angularly related with respect to the optical axis O1 of the illuminating system shown at the bottom of Fig. 6 provided that said line intercepts the web T1 at a point lower than the point where said optical axis O1 engages the web, Fig. 6.

As illustrated in Fig. 6, a light ray r4 is shown as emanating from the filament f1 and passing to the reflector R4. By the latter, said ray r4 is reflected back upon itself and passes through the lenses L4 and L5 and engages the web T1. This light ray r4 coincides with a line defining the principal axis of the reflector R4. Other light rays r5 and r6 are shown as emanating from the filament f1, passing to the reflector R4 along paths parallel with the path of ray r4, and being thereby reflected through the lenses L5 and L6 as indicated. Said light rays r5 and r6 substantially define a beam of light which coacts with the side area a6 of the web T1. As regards light reflected by the reflector R4, the beam of light just described illuminates the aforesaid web side area a6 to much greater extent than other and more central areas of said web T1 are illuminated. Of course, there is appreciable illumination of other screen areas by light reflected from the reflector R4. However, as stated, the most intense illumination by reflected light occurs on the web side area a6. The reflector R4 shown as positioned at the top of Fig. 6 similarly effects more intense illumination of the side area a4 of web T1 than other web areas.

The two illuminating systems shown in Fig. 6 may be symmetrically positioned with respect to the web T1. The optical axis O1 of each illuminating system is obliquely related to the web T1 and, therefore, in the plane of the web, when the lenses L5 and L6 are of the character stated, the light beam produced by light passing directly thereto from each filament f1 covers a space substantially as defined by an ellipse. This is illustrated in Fig. 8 where the ellipse E4 at the bottom designates approximately the area with which coacts light passing directly to the web from the source of light S1 at the bottom of Fig. 6 whereas the ellipse E4 at the top of Fig. 8 designates approximately the area with which coacts light passing directly to the web from the source of light S1 at the top of Fig. 6. If desired, and as illustrated in Fig. 8, the relation of the illuminating systems with respect to each other and to the framed position of the web T1 may be such that the ellipses do not coincide although the relation may be otherwise if desired.

If it is assumed that the reflectors R4 are omitted, then the only light reaching the framed position of web T1 is that passing directly thereto from the filaments f1. This light is reflected by the aforesaid framed portion of the web T1 and passes through the lens L4, after which, in the example shown, it is reflected by the mirrors M4 and M5. Thereafter, the reflected light engages the screen A1 to produce non-uniform illumination thereof in the sense that the ends thereof (the sections receiving images of the indicia at the sides of web T1) are illuminated to a less degree than is the screen central area. This non-uniform screen illumination is due in part, at least, to losses occasioned by the fact that the light traveling to the aforesaid screen ends traverses longer paths than does the light passing to the screen central area.

Non-uniform illumination of the screen A1 is substantially the same as described above if it is assumed that the reflectors R4 are utilized and that they are so positioned that their principal axes coincide, respectively, with the optical axes O1 of the illuminating systems each of which comprises a source of light S1.

However, with the reflectors R4 so positioned that they reflect light principally or largely to the side areas a4 and a6, for example, of web T1, the aforesaid non-uniform illumination of the screen A1 is largely or substantially overcome. Accordingly, the ends of said screen A1 are illuminated to substantially the same degree as is the screen central area.

In the forms of my invention herein illustrated, the objective lenses are traversed by light coming from the respective object fields. That is, the objective lens L2, at any given time, receives light from the tape section t, Fig. 4, and the objective lens L4 similarly receives light from that part of the web T1 defined by the frame 2a. As hereinbefore stated and in accordance with my invention, the end areas of the aforesaid tape section t and the side areas a4 and a6 of the framed part of the web T1 are supplied with light to a greater extent than has heretofore been the practice. Ordinarily, in accordance with my invention, the aforesaid tape section t and framed part of web T1 are unevenly illuminated, the tape end areas and web side areas being supplied with greater amounts of light than the respective central areas of the tape and web in the object field. However, by the time that the light reaches the proper screen, due to inevitable losses, the unevenness is eliminated and, as a result, substantially uniform screen illumination is obtained.

As regards that aspect of my invention involving the reflectors R, R4, or equivalent, it shall be understood that the character of the lens system between any source of the light and the indicia-bearing surfaces may depart widely from that herein shown and described. In Figs. 6, 7 and 8, however, my invention has two important aspects and it shall be clearly understood that they may be utilized singly or jointly as desired. Thus, as regards the reflectors R4, or equivalent, a lens system between the source of light and the web T1 may or may not be utilized as desired. Furthermore, as regards a lens system between a source of light and a light-reflecting surface, particularly a movable reflecting or light-opaque web, the reflectors R4 may or may not be utilized as desired. In other words, it shall be understood in connection with Figs. 6, 7 and 8, that my invention, in one of its prominent phases relates solely to the provision of a lens system (one or more lenses) of any suitable character between a source of light and a light reflecting surface, particularly a movable reflecting or light-opaque web and still more particularly in an arrangement where the light path and web path in the object field are obliquely related.

It shall also be understood, with respect to all forms of my invention, that suitable casings are provided as desired to prevent unwarranted entrance of light from undesired sources.

While the invention has been described with respect to certain particular preferred examples which give satisfactory results, it will be understood by those skilled in the art after understanding the invention, that various changes and modifications may be made without departing from the spirit and scope of the invention and it is intended therefore in the appended claims to cover all such changes and modifications.

What is claimed as new and desired to be secured by Letters Patent is:

1. In a projection system, the combination with a light reflecting surface having indicia thereon, of a plurality of spaced light sources from which light passes obliquely and in converging relation toward the same area of said surface, and means independent of the direct illumination of said surface by said light sources for passing light principally to outer areas of said surface area.

2. In a projection system, the combination with a light reflecting surface having indicia thereon, of a plurality of spaced light sources from which light passes obliquely and in converging relation toward the same area of said surface, and means independent of the direct illumination of said surface by said light sources for passing light principally to outer areas of said surface area, said means comprising reflectors coacting, respectively, with said light sources and passing light along axes obliquely related to the axes of the respective light sources.

3. In a projection system, the combination with a light reflecting surface having indicia thereon, of a plurality of spaced light sources from which light passes obliquely and in converging relation toward the same area of said surface, lens systems between each of said light sources and said surface, and means independent of the direct illumination of said surface by said light sources for passing light principally to outer areas of said surface area.

FRANK E. HALLORAN.